US008636106B2

(12) United States Patent
Castagnetti et al.

(10) Patent No.: US 8,636,106 B2
(45) Date of Patent: *Jan. 28, 2014

(54) AUTOMOTIVE TRIM PART FOR SOUND INSULATION AND ABSORPTION

(75) Inventors: Claudio Castagnetti, Stallikon (CH); Claudio Bertolini, Sesto San Giovanni (CH)

(73) Assignee: Rieter Technologies AG, Winterhur (CH)

( * ) Notice: Subject to any disclaimer, the term of this patent is extended or adjusted under 35 U.S.C. 154(b) by 0 days.

This patent is subject to a terminal disclaimer.

(21) Appl. No.: 13/570,730

(22) Filed: Aug. 9, 2012

(65) Prior Publication Data
US 2013/0062142 A1 Mar. 14, 2013

Related U.S. Application Data

(63) Continuation of application No. 13/043,756, filed on Mar. 9, 2011, now Pat. No. 8,261,876.

(30) Foreign Application Priority Data

Mar. 9, 2010 (EP) .................................... 1015903
Mar. 9, 2010 (EP) .................................... 1015905

(51) Int. Cl.
*E04B 1/82* (2006.01)

(52) U.S. Cl.
USPC .......................................................... 181/290

(58) Field of Classification Search
USPC .......................................................... 181/290
See application file for complete search history.

(56) References Cited

U.S. PATENT DOCUMENTS 4,242,398 A   12/1980   Segawa et al.
5,298,694 A    3/1994   Thompson et al.
(Continued)

FOREIGN PATENT DOCUMENTS

EP   0 079 253 A1   5/1983
EP   1 428 656 A1   6/2004
(Continued)

OTHER PUBLICATIONS

Bertolini et al., "Transfer function based method to identify frequency dependent Young's modulus, Poisson's ratio and damping loss factor of poroelastic materials," Symposium on acoustics of poro-elastic materials (SAPEM), Bradford, Dec. 2008.

(Continued)

*Primary Examiner* — Forrest M Phillips
(74) *Attorney, Agent, or Firm* — Finnegan, Henderson, Farabow, Garrett & Dunner, LLP

(57) ABSTRACT

A sound insulating trim part is provided. The sound insulating trim part includes an absorbing area and an insulating area. The absorbing area includes at least a first portion of a porous fibrous layer. The insulating area includes a mass layer and a decoupling layer. The mass layer includes a second portion of the same porous fibrous layer. The second portion has a dynamic Young's modulus (Pa) of at least about (96·AW·t) with AW being an area weight (g/m$^2$), and t being a thickness (mm) of the porous fibrous layer. The mass layer also includes at least a substantially air impervious barrier layer between the porous fibrous layer and the decoupling layer. The thickness of the first portion of the porous fibrous layer in the absorbing area is larger than the thickness of the second portion of the same porous fibrous layer in the insulating area.

19 Claims, 11 Drawing Sheets

(56) References Cited

U.S. PATENT DOCUMENTS

| | | | |
|---|---|---|---|
| 5,509,247 A | 4/1996 | Fortez et al. | |
| 5,744,763 A | 4/1998 | Iwasa et al. | |
| 5,892,187 A | 4/1999 | Patrick | |
| 5,922,265 A | 7/1999 | Parekh | |
| 6,145,617 A | 11/2000 | Alts | |
| 6,290,022 B1 | 9/2001 | Wolf et al. | |
| 6,712,179 B2 | 3/2004 | Bouyonnet | |
| 6,955,845 B1 | 10/2005 | Poole et al. | |
| 7,677,358 B2 | 3/2010 | Tocchi et al. | |
| 8,261,876 B2 * | 9/2012 | Castagnetti et al. | 181/290 |
| 2004/0075290 A1 | 4/2004 | Campbell | |
| 2004/0131836 A1 | 7/2004 | Thompson | |
| 2006/0113146 A1 | 6/2006 | Khan et al. | |
| 2006/0201741 A1 * | 9/2006 | Inoue et al. | 181/204 |
| 2008/0067002 A1 * | 3/2008 | Pfaffelhuber et al. | 181/290 |
| 2008/0073146 A1 | 3/2008 | Thompson, Jr. et al. | |
| 2009/0085378 A1 * | 4/2009 | Borchardt et al. | 296/191 |

FOREIGN PATENT DOCUMENTS

| | | |
|---|---|---|
| EP | 2 159 786 A1 | 3/2010 |
| FR | 2 908 550 A1 | 5/2008 |
| JP | 2001-310672 | 11/2001 |
| JP | 2001-347899 | 12/2001 |
| WO | WO 2006/007275 A1 | 1/2006 |

OTHER PUBLICATIONS

European Search Report dated Aug. 25, 2010, regarding corresponding European Application No. 10155903.7 (5 pages).
European Search Report dated Sep. 1, 2010, regarding corresponding European Application No. 10155903.7 (6 pages).
Langlois et al., "Polynomial relations for quasi-static mechanical characterization of isotropic poroelastic materials," J. Acoustical Soc. Am. 2001, vol. 10, No. 6, p. 3032-3040.
Danilov et al., On the limits of an "in vacuum" model to determine the mechanical parameters of isotropic poroelastic materials, Journal of Sound and Vibration, vol. 276, Issues 3-5, Sep. 2004, 26 pages.
Materiacustica, Report on mechanical properties of porous materials, Dec. 3, 2012, 6 pages.
Quattroruote, Hyundai i30 1.6 Crdi Il Prezzo Della Qualità, Jan. 31, 2008, 2 pages.
Auto Motor und Sport, Hyundai i30, Kia Cee'd und VW Golf, Sep. 2007, 11 pages.
Hankook Pelzer Ltd., Invoice to Hyundai Motor Manufacturing Czech s.r.o., Dec. 1, 2008, 3 pages.
Shim et al., Hyundai and Kia Engineering Standard—Material Specification—Dash Isolation Pad—Multi Absorption Type, Nov. 30, 2004, 10 pages.
Notice of Opposition opposing European Patent No. EP 2 365 483 B1, Jan. 4, 2013, 29 pages.
Hankook Pelzer Ltd., Isolation Pad Assembly Dash Panel, Aug. 31, 2007, 5 pages.

* cited by examiner

AUTOMOTIVE TRIM PART FOR SOUND INSULATION AND ABSORPTION

PRIORITY

This is a continuation of application Ser. No.13/043,756, filed Mar. 9, 2011 now U.S. Pat. No. 8,261,876, which claims the benefit of priority of European Patent Application No. EP1015903, filed Mar. 9, 2010, and titled "AUTOMOTIVE INSULATING TRIM PART," and the benefit of priority of European Patent Application No. EP1015905, filed Mar. 9, 2010, and titled "AUTOMOTIVE TRIM PART FOR SOUND INSULATION AND ABSORPTION," all of which are incorporated herein by reference in their entirety.

This application is related to copending U.S. Nonprovisional Application, entitled "AUTOMOTIVE INSULATING TRIM PART," U.S. patent application Ser. No. 13/043,748, filed Mar. 9, 2011, by Castagnatti et al., which is incorporated by reference in its entirety.

TECHNICAL FIELD

The present disclosure relates generally to an automotive trim part, and more particularly, to an automotive trim part for noise insulation in a vehicle.

BACKGROUND

The sources of noise in a vehicle are many and include, among others, power train, driveline, tire contact patch (excited by the road surface), brakes, and wind. The noise generated by all these sources inside the vehicle's cabin can cover a rather large frequency range that, for normal diesel and petrol vehicles, may go up to 6.3 kHz (above this frequency, the acoustical power radiated by the noise sources in a vehicle is generally negligible). Vehicle noise is generally divided into low, middle and high frequency noise. Typically, low frequency noise may be considered to cover the frequency range between 50 Hz and 500 Hz and may be dominated by "structure-borne" noise: vibration is transmitted to the panels surrounding the passengers' cabin via a variety of structural paths and such panels then radiate noise into the cabin itself. On the other hand, high-frequency noise may typically be considered to cover the frequency range above 2 kHz. High-frequency noise is typically dominated by "airborne" noise: in this case the transmission of vibration to the panels surrounding the passengers' cabin takes place through airborne paths. It is recognized that a grey area exists, where the two effects are combined and neither of the two dominates. However, for passenger comfort, it may be important that the noise is attenuated in the middle frequency range as well as in the low and high frequency ranges.

For noise attenuation in vehicles, such as cars and trucks, the use of insulators, dampers and absorbers to reflect and dissipate sound and thus reduce the overall interior sound level is well known.

Insulation is traditionally obtained by means of a "mass-spring" barrier system, whereby the mass element is formed by a layer of high density impervious material normally designated as heavy layer and the spring element is formed by a layer of low density material like a non compressed felt or foam. The name "mass-spring" is commonly used to define a barrier system that provides sound insulation through the combination of two elements, called "mass" and "spring". A part or a device is said to work as a "mass-spring" if its physical behaviour can be represented by the combination of a mass element and a spring element. An ideal mass-spring system acts as a sound insulator due mainly to the mechanical characteristics of its elements, which are bonded together.

A mass-spring system for sound insulation in a vehicle is normally placed on top of the steel layer, with the spring material in contact with the steel. If considered as a whole, the complete system (the mass-spring plus the steel layer) may have the characteristic of a double partition. The insertion loss is a quantity describing the effectiveness of the mass-spring system when put on top of the steel layer, independently from the insulation provided by steel layer itself. The insertion loss thus shows the insulation performance of the mass-spring system.

The theoretical insertion loss (IL) curve (measured in dB) that characterizes a mass-spring system will now be described. On most of the frequency range, the curve increases with the frequency in an approximately linear way, and the rate of growth is about 12 dB/octave. This linear trend is considered effective for insulating against the incoming sound waves. For this reason, mass-spring systems have been widely used in the automotive industry. This trend is achieved only above a certain frequency value, called "resonance frequency of the mass-spring system," at which the system is not effective as a sound insulator. The resonance frequency depends on the weight of the mass element (the higher the weight, the lower the resonance frequency) and on the stiffness of the spring (the higher the stiffness, the higher the resonance frequency). At the resonance frequency of the mass-spring system, the spring element transmits the vibration of the underlying structure to the mass element in a very efficient way. At this frequency, the vibration of the mass element is even higher than that of the underlying structure, and thus the noise radiated by the mass element is even higher than the one that would be radiated by the underlying structure without mass-spring system. As a consequence, the IL curve has a negative minimum around the resonance frequency.

Both absorbing and insulating systems on their own have only a small bandwidth of frequencies where they work optimally. The absorber generally works better in the high frequencies, while the insulator generally works better in the low frequencies. Furthermore, both systems are sub-optimal for use in a modern vehicle. The effectiveness of the insulator may strongly depend on its weight: e.g., the higher the weight, the more effective the insulator. The effectiveness of the absorber, on the other hand, may strongly depend on the thickness of the material: e.g., the thicker the better. Both thickness and weight are becoming increasingly restricted, however. The space in a car where the trims are placed is also restricted. For example, the weight impacts the vehicle's fuel economy and the thickness of the material impacts the vehicle's spaciousness.

Recently, a trend towards lower weights for the mass layer or heavy layer for conventional mass-spring systems has decreased the average weight from about 3 ($kg/m^2$) to around 2 ($kg/m^2$). This drop in area weight also means using less material and thus less cost. Even lower weights down to 1 ($kg/m^2$) are possible and present on the market, but the technology to achieve this may be expensive and may have drawbacks in particular for low volume mass production. Typical mass layers are made of highly-filled dense materials, such as EPDM, EVA, PU, PP, etc. Since these materials have a high density (normally above 1000 ($kg/m^3$)), it may be necessary to make a very thin layer to obtain the low area weight. However, this can increase production costs and cause production problems, such as the material tearing easily during molding.

The insulation performance of an acoustical barrier is typically assessed by sound transmission loss (TL). The ability of an acoustical barrier to reduce the intensity of the noise being transmitted depends, at least in part, on the nature of the material(s) forming the barrier. An important physical property controlling sound TL of an acoustical barrier is the mass per unit area of its component layers. For best insulating performance, the mass layer of a mass-spring system will often have a smooth high-density surface to maximize reflection of noise waves, a non-porous structure and a certain material stiffness to minimize vibration. From this viewpoint, it is known that many textile fabrics, that are either thin or porous in structure, are not ideal for noise insulation.

JP 2001310672 discloses a multi-layer structure consisting of two absorbing layers with a sound reflecting film layer in between. The film layer reflects sound penetrating the absorbing layer back to the same absorbing layer, thereby increasing the absorbing effect of the multilayer structure. The system may be tuned by optimizing the film thickness and the density of the film.

JP 2001347899 discloses a common mass-spring system with an additional absorbing layer on top of the mass layer. Because of the increase in noise attenuation guaranteed by the additional absorbing layer, the thickness and/or the density of the mass layer may be reduced.

EP 1428656 discloses a multi-layer structure consisting of a foam layer and a fibrous layer with a film in between both layers. The fibrous layer, made of compressed felt, may function as an absorbing layer with an airflow resistance (AFR) of between 500 and 2500 ($Nsm^{-3}$) and an area mass of between 200 and 1600 ($g/m^2$). The disclosed foam layer has a low compression force deflection with stiffness between 100 and 100000 (Pa), comparable to the stiffness of a felt layer normally used as a decoupler. The film used is preferably perforated or thin enough to not have an impact on the absorption of both absorbing layers together. The film is called acoustically transparent to indicate that the sound waves may pass the film. The thickness disclosed is in the range of 0.01 (mm) or less for this purpose.

Normally, to reduce the sound pressure level in the passengers' compartment, a vehicle requires a good balance of the insulation and absorption provided by the acoustical trim parts. The different parts may have different functions (e.g., insulation may be provided on the vehicle's dash, while absorption may be provided on the carpet). There is a current trend, however, to refine the acoustical functions of particular areas of the vehicle, as part of optimizing the vehicle's overall acoustical performance. As an example, the vehicle's inner dash may be split in two parts, one providing high absorption and another providing high insulation. Generally, the lower part of the dash may be more suitable for insulation, because the noise coming from the engine and the front wheels through this lower area is more relevant, while the upper part of the dash may be more suitable for absorption, because some insulation may already be provided by other elements of the car, for instance the instrumentation panel. In addition, the backside of the instrumentation panel may reflect sound waves coming through the part of the upper dash hidden behind the instrumentation panel itself. These reflected sound waves could be effectively eliminated using absorbing material. Similar considerations may be applied to other acoustical parts of the car. For instance, insulation is typically used in the foot-well areas and around the tunnel area, while absorption is typically used underneath the front seat and in the rear floor panels.

For the above reasons, vehicle manufacturers typically use patches or locally applied additional material. For instance, U.S. Pat. No. 5,922,265 discloses a method of applying heavy layer material in specified areas of a trim part, while the areas without the heavy layer material will act as absorber. These hybrid type of products can have the disadvantage that they still increase the area weight to obtain a combined noise absorbing and insulating solution. They can also be labor and cost intensive. In addition, material used as a decoupler for an acoustic mass-spring system may not be optimal for use as an absorber. Furthermore, the use of different types of materials can make recycling of the parts and discarded material more difficult.

SUMMARY

The present disclosure is thus directed to a sound-insulating or acoustic trim part, which may work over the range of frequencies important for noise reduction in a vehicle.

In one example embodiment, the present disclosure is directed to a sound insulating trim part comprising at least one absorbing area with sound absorbing characteristic. The absorbing area comprises at least a first portion of a porous fibrous layer. The trim part also comprises at least one insulating area with acoustic mass-spring characteristic. The insulating area further includes a mass layer and a decoupling layer adjacent the mass layer. The mass layer further includes a second portion of the same porous fibrous layer as included in the absorbing area, the second portion being adjusted to have a dynamic Young's modulus (Pa) of at least about (96·AW·t), with AW being area weight ($g/m^2$), and t being thickness (mm) of the porous fibrous layer. The mass layer also includes a barrier layer, between the porous fibrous layer and the decoupling layer, that is substantially air impervious. The thickness of the first portion of the porous fibrous layer in the absorbing area is larger than the thickness of the second portion of the same porous fibrous layer in the insulating area.

In another example embodiment, the present disclosure is directed to a sound insulating trim part for a vehicle, wherein the trim part provides a combined insulator and absorber to at least a portion of the vehicle. The sound insulating trim part comprises at least one absorbing area with sound absorbing characteristic, wherein the absorbing area includes at least a first portion of a porous fibrous layer. The trim part also includes at least one insulating area with acoustic mass-spring characteristic. The insulating area further includes a mass layer and a decoupling layer adjacent the mass layer. The mass layer further includes a second portion of the same porous fibrous layer included in the absorbing area, the second portion being adjusted to have a dynamic Young's modulus (Pa) of at least about (96·AW·t), with AW being area weight ($g/m^2$), and t being thickness (mm) of the porous fibrous layer. The mass layer also includes a barrier layer, between the porous fibrous layer and the decoupling layer, that is substantially air impervious and having a thickness of less than about 80 (μm). The thickness of the first portion of the porous fibrous layer in the absorbing area is larger than the thickness of the second portion of the same porous fibrous layer in the insulating area.

In yet another example embodiment, the present disclosure is directed to a sound insulating trim part. The trim part comprises at least one absorbing area with sound absorbing characteristic, wherein the absorbing area comprises at least a first portion of a porous fibrous layer. The trim part also includes at least one insulating area with acoustic mass-spring characteristic. The insulating area further includes a mass layer and a decoupling layer adjacent to the mass layer. The mass layer further includes a second portion of the same porous fibrous layer included in the absorbing area, the second portion being adjusted to have a dynamic Young's modulus (Pa) of at least about 96·AW·t, with AW being area weight (g/m²), and t being thickness (mm) of the porous fibrous layer. The mass layer also includes a barrier layer, between the porous fibrous layer and the decoupling layer, that is substantially air impervious. The thickness of the first portion of the porous fibrous layer in the absorbing area is larger than the thickness of the second portion of the same porous fibrous layer in the insulating area. An additional absorbing layer is provided at least partially on top of the porous fibrous layer. An additional scrim is provided at least partially on top of the porous fibrous layer and/or the additional absorbing layer.

Additional objects and advantages of the disclosed embodiments will be set forth in part in the description which follows, and in part will be obvious from the description, or may be learned by practice of the disclosed embodiments. The objects and advantages of the present disclosure will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF DRAWINGS

The accompanying drawings, which are incorporated in and constitute a part of this specification, illustrate embodiments of the invention and together with the description, serve to explain the principles of the present disclosure. In the drawings.

DETAILED DESCRIPTION

Figure 1:
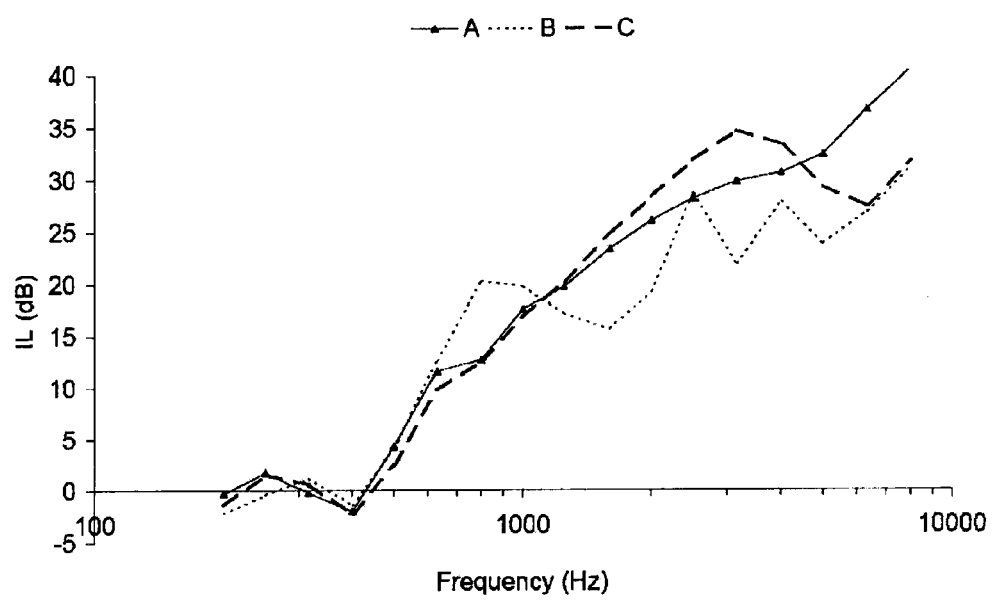
FIG. 1 illustrates an insertion loss of samples A-C.

The disclosed embodiments relate to an acoustic mass-spring system using a porous fibrous material and an air impervious barrier layer as the mass layer. In certain disclosed embodiments, the mass layer may be formed using a porous fibrous material with a dynamic Young's modulus of at least: 96·AW·t (Pa) to obtain a radiation frequency of the porous fibrous material of at least 4900 (Hz). As described in further detail below, such an arrangement may obtain effective insulation performance over a desired frequency range, without a disturbing frequency dip in the sound TL spectrum.

As described herein, in example embodiments, the resonance frequency of the mass-spring system and the radiation frequency of the fibrous top layer result in different and independent effects on the IL curve. In these example embodiments, both appear in the IL curve of a multilayer and produce a negative effect on the insulation performance, both causing the presence of a dip in the IL curve. Normally, two dips are observed in two separate sections of the IL curve. In particular, for the considered types of multilayers, the IL curve may have a dip around the mass-spring resonance frequency that is normally observed in the range of 200 to 500 Hz. The IL curve may also have a second dip around the porous fibrous layer's radiation frequency that is normally in the range above 1000 Hz. The terms "resonance" and "radiation" are used herein to distinguish between these two different frequencies.

The disclosed embodiments also relate to the use of insulating and absorbing areas to tune the sound attenuation in a vehicle. More specifically, the disclosed embodiments allow use of the same porous fibrous layer throughout an acoustic trim part, for both the insulating area and the absorbing area. The disclosed embodiments may thus integrate both functions in a common acoustic trim part. The skilled person in the art will readily understand which areas of the trim part may require insulation or absorption. By using the disclosed embodiments, the skilled person may also do so by using less types of material. More specifically, a trim part consistent with the disclosed embodiments has at least one absorbing area and one insulating area. The actual number of areas per each acoustic function (insulation or absorption) and/or the size of these areas may differ, depending on the part and on the location where the part is used and dependent on the actual requirements.

As discussed above, conventional mass-spring systems typically achieve a higher transmission loss by using a mass layer or barrier layer that is air impervious. The disclosed example embodiments, on the other hand, use a porous fibrous material and an air impervious barrier layer as the mass layer. More specifically, in certain disclosed embodiments of an acoustic trim part, the mass layer may be formed using a porous fibrous layer with a dynamic Young's modulus of at least: 96·AW·t (Pa) to obtain a radiation frequency of the porous fibrous layer of at least 4900 (Hz). As described in further detail below, this may obtain good insulation performance over a desired frequency range, without a disturbing frequency dip in the sound TL spectrum.

An absorbing area generally corresponds to an area of the trim part that behaves substantially as absorber and substantially not as an insulator. An insulating area generally corresponds to an area on the trim part that behaves substantially as an insulator. An insulating area may, however, also behave as an absorber in certain applications.

Porous Fibrous Layer

The use of porous fibrous materials, such as felt or nonwoven materials, for the construction of acoustic absorbing parts is well known in the art. The thicker the fibrous layer, usually the better the acoustic absorption. However, it is not known in the art to use, as in the disclosed embodiments, a porous fibrous layer as a mass layer in a mass-spring system.

As disclosed herein, the dynamic Young's modulus is related to the radiation frequency of the porous fibrous layer according to the equation $E = AW \cdot 4tv^2$ (Equation 1), with E being the dynamic Young's modulus (Pa), v being the radiation frequency (Hz), AW being the Area Weight (kg/m²), and t being the thickness (m).

According to Equation 1, a suitable value of the dynamic Young's modulus may enable the design of a trim part with the radiation frequency outside the frequency range of interest to obtain an undisturbed insertion loss in the frequency range of interest. For example, if the dynamic Young's modulus is higher than the minimum value defined as $E_{min}=AW\cdot4\cdot v_0^2$, with $v_0=4900$ Hz, then the radiation frequency of the porous fibrous layer may appear above the frequency range of application of the trim parts. Therefore, in certain embodiments, the dynamic Young's modulus of the porous fibrous layer may be at least $96\cdot AW\cdot t$ (Pa), with AW (g/m$^2$) and t (mm). This may give a high dynamic Young's modulus at which the material may not be easily compressed.

In disclosed embodiments, the acoustic trim part may thus contain a porous fibrous layer with at least a dynamic Young's modulus of $96\cdot AW\cdot t$ (Pa), a decoupling layer, and an impervious barrier layer between the porous fibrous layer and the decoupling layer. All layers may be laminated together to form one part and may thus function as an acoustic mass-spring system. The porous fibrous layer together with the film barrier layer may be an alternative mass layer. Such a mass layer consistent with the disclosed embodiments may thus replace the heavy layer material used in a conventional trim part. The porous fibrous layer in combination with a thin barrier layer may also be less expensive and easier to recycle in comparison to conventional mass-spring systems using a heavy layer material.

In the disclosed embodiments, the porous fibrous layer may be any type of felt. It may be made from any thermo formable fibrous materials, including those derived from natural and/or synthetic fibers. Preferably the felt is made of recycled fibrous material, such as shoddy cotton or other recycled fibers, such as polyester. The fibrous felt material may also include a binding material, either as binding fibers or as resinous material, such as thermoplastic polymers. Certain embodiments may use at least 30% Epoxy resin or at least 25% bi-component binder fibers. However, other binding fibers and/or materials achieving the porous fibrous layer according to the embodiments may also be used. The area weight of the fibrous layer may be between 500 and 2000 (g/m$^2$), more preferably between 800 and 1600 (g/m$^2$).

In some applications, the available space for the acoustic trim part may be limited, e.g., to a maximum 20 to 25 mm. For such applications, the thickness of the porous fibrous layer may be between 1 and 10 (mm), and preferably between 1 and 6 (mm), to allow enough space for the decoupling layer. The decoupling layer may vary in thickness to compensate for the particular form required by the acoustic trim part to fit in the vehicle.

The airflow resistance (AFR) of the porous fibrous layer in the absorbing area is preferably between 300 and 3000 (Nsm$^{-3}$), and preferably between 400 and 1500 (Nsm$^{-3}$). A higher AFR is generally better for absorption. However, since AFR typically decreases with increasing thickness, the AFR is preferably between 400 and 1500 (Nsm$^{-3}$) for a thickness of between 8 and 12 (mm). Adding additional absorbing layers may further enhance the absorption; either locally on the absorbing areas or as an additional layer on basically the whole trim part. In the insulating area, this may effectively form a combined absorption and insulating area. The additional layers may be in the form of felt material similar to or the same as the material used for the porous fibrous layer and/or additional scrim layers.

Next to the absorbing areas and the insulating areas, intermediate areas may also exist that form the areas between an insulating area and an absorbing area or around the rim of the part. These areas may be less easy to identify as either an absorbing area or insulating area. In particular, such intermediate areas may have increasing thickness in the direction of the absorbing area and may thus have characteristics between a good absorber and a good insulator. Other types of intermediate areas may exist locally at highly three-dimensional or structured areas or at highly compressed areas around holes in the trim part (e.g., needed for throughput of cables or mounting fixtures). These areas are normally not dedicated to acoustic insulation as the nature of the holes may destroy any insulating characteristic in their close vicinity.

Thin Barrier Layer

In disclosed embodiments, the barrier layer may be located between the porous fibrous layer and the decoupling layer. In certain embodiments, the barrier layer is a thin barrier layer that is also impervious so as to function as a sound barrier. When the barrier layer is thin, it may not have the mass to function as a conventional mass layer. As described below, however, if the thin barrier layer is air impervious, the porous fibrous layer together with the thin barrier layer may function as a mass layer for a classic mass-spring system. Although a film is given in the examples, alternative non-permeable thin materials may be used.

The barrier layer may have a thickness of at least 40 (μm), and preferably a thickness of about 60 to 80 (μm). Thicker films up to 300 (μm) may also be used, depending on the application.

The thin barrier layer, in particular a film, may be made from thermoplastic material, such as PVOH, PET, EVA, PE, PP, or dual layer materials such as a PE/PA foil laminate. The choice of the barrier material may depend on the fibrous layer and on the decoupling layer. The thin barrier layer may be bound with the fibrous layer and the decoupling layer to form a laminate. Materials that are used as an adhesive, either in the form of a film or powder, may also be used in the thin barrier layer. After binding and/or forming the trim part, the thin barrier layer may be impervious to air in the final product. Other suitable materials that form an impervious barrier layer may also be used in the thin barrier layer.

The thin barrier layer may not necessarily be present in the absorbing areas and/or intermediate areas. However, for ease of production, this may be recommended.

Decoupling Layer

The decoupling layer may be formed from any type of thermoplastic and thermosetting foam, closed or open, e.g., a polyurethane foam. The decoupling layer may also be formed using the types of material commonly used for the spring layer in a conventional acoustic mass-spring system. The decoupling layer may also be made from fibrous materials, e.g. thermo formable fibrous materials, including those derived from natural and/or synthetic fibers.

In the disclosed embodiments, the decoupling layer may have a compression stiffness of less than 100 (kPa). The decoupling layer may also be porous or open pored to enhance the spring effect. The decoupling layer may be attached to the film layer over the entire surface of the acoustic trim part or, due to production requirements, to only a portion of the trim part. In the later case, because the acoustic trim part should function overall as an acoustical mass-spring system, small local areas where the decoupling layer is not present may not impair the overall attenuation effect.

The thickness of the decoupling layer may be optimized. However, this may depend mostly on space restrictions in the vehicle. In certain embodiments, the thickness may be varied over the area of the part to follow the available space in the car. Normally the thickness may be between 1 and 100 (mm), and in most areas may be between 5 and 20 (mm).

Additional Layers

As described below, exemplary embodiments of the acoustic trim part may comprise three layers. However, certain embodiments may also include an additional layer with absorbing qualities. Such an additional absorbing layer may be added to the whole or to a portion of the acoustic trim part. In an exemplary embodiment, the area weight of the additional layer is preferably between 500 and 2000 (g/m$^2$).

The absorbing layer may be formed from any type of thermoplastic and thermosetting foam, e.g. polyurethane foam. However, for the purpose of absorbing noise, the foam may be open pored and/or porous to enable the entrance of sound waves according to the principles of sound absorption, as known in the art. The absorbing layer may also be made from fibrous material, e.g. thermo formable fibrous materials, including those derived from natural and/or synthetic fibers. In some embodiments, the absorbing layer may be made of the same type of material as the fibrous porous mass layer but loftier. The airflow resistance (AFR) (as measured according to ISO9053) of the absorbing layer is preferably at least 200 (Nsm$^3$), and may preferably be between 500 and 2500 (Nsm$^{-3}$). Also, absorbing systems with more than one absorbing layer may be placed on top of the porous fibrous layer.

An additional scrim may also be placed on top of either the absorbing material or the porous fibrous layer to enhance even further the acoustic absorption and/or to protect the underlying layers against, for example, water. A scrim may be a thin nonwoven material with a thickness between 0.1 and about 1 (mm), preferably between 0.25 and 0.5 (mm). The scrim may also have an increased AFR, such as an AFR of between 500 and 3000 (Nsm$^{-3}$), and may preferably be between 1000 and 1500 (Nsm$^{-3}$). In certain embodiments, the scrim and the underlying absorbing layer may have a different AFR to increase absorption.

The area weight of the scrim layer may be between 50 and 250 (g/m$^2$), preferably between 80 and 150 (g/m$^2$). The scrim may be made from continuous or staple fibers or fiber mixtures. The fibers may be made by meltblown or spunbond technologies. They may also be mixed with natural fibers. The scrims may be made of polyester, polyolefin fibers, or a combination of fibers such as polyester and cellulose, or polyamide and polyethylene, or polypropylene and polyethylene.

Further Description of Acoustic Trim Part

The disclosed embodiments of the acoustic trim part may be produced with cold and/or hot molding methods commonly known in the art. For instance, the porous fibrous layer, with or without the barrier layer, may be formed to obtain the desired dynamic Young's modulus and at the same time formed to the desired shape for the particular vehicle. The decoupling layer may be either injection molded or may be a foam or fiber layer that may be added to the backside of the film barrier layer.

Mechanical stiffness relates to the reaction that a material (or a layer of material) offers to an external stress excitation. Compression stiffness relates to a compression excitation and to the resulting compression strain. For a homogeneous plate made with an isotropic material, the compression stiffness relates to the product of the elastic modulus E of the material and the surface A of the plate. Bending stiffness relates to an applied bending excitation or bending moment to the resulting deflection.

For a plate made with an isotropic material, both the compression stiffness and the bending stiffness relates to the material's dynamic Young's modulus and it is possible to calculate one from the other. However, if the material is not isotropic, as the case for many felts, these relationships may not apply because the bending stiffness relates to the in-plane material's dynamic Young's modulus, while the compression stiffness relates to the out-of-plane dynamic Young's modulus. Therefore, it may not be possible to calculate one from the other. In addition, both compression stiffness and bending stiffness may be measured in static or dynamic conditions and are generally different in static and dynamic conditions.

The noise radiation from a layer of material originates from the vibrations of the layer orthogonal to its plane and relates to the dynamic compression stiffness of the material. The dynamic compression Young's modulus of a porous material may be measured with a commercially available "Elwis-S" device from Rieter Automotive AG, in which the sample is excited by a compression stress. The measurement using Elwis-S is described in, for instance, BERTOLINI, et al., "Transfer function based method to identify frequency dependent Young's modulus, Poisson's ratio and damping loss factor of poroelastic materials," *Symposium on acoustics of poro-elastic materials (SAPEM)*, Bradford, December 2008.

As these types of measurements are not generally used yet for porous materials, there exists no official NEN or ISO norm for such materials. However, other similar measurement systems are well-known based on similar physical principles, as described in LANGLOIS, et al., "Polynomial relations for quasi-static mechanical characterization of isotropic poroelastic materials," *J. Acoustical Soc. Am.* 2001, vol. 10, no. 6, p. 3032-3040.

The disclosed embodiments and Equation 1 are also based on the dynamic Young's modulus, as opposed to the static Young's modulus. A direct correlation of a Young's modulus measured with a static method and a Young's modulus measured with a dynamic method, is not straightforward and in most cases may be meaningless, because the dynamic Young's modulus is measured in the frequency domain over a predefined frequency range (e.g., 300-600 Hz) and the static value of the Young's modulus corresponds to the limit-case of 0 (Hz), which is not directly obtainable from dynamic measurements. Further, as described herein, the dynamic Young's modulus relates to compression stiffness, rather than necessarily a material's mechanical stiffness.

The transmission loss (TL) of a structure represents its sound insulation. It represents the ratio, expressed in decibels, of the acoustic power incident on the structure and the acoustic power transmitted by the structure to the receiving side. In the case of an automotive structure equipped with an acoustical part, transmission loss is not only due to the presence of the part, but also to the steel structure on which the part is mounted. Since it may be important to evaluate the sound insulation capabilities of an automotive acoustical part independently from the steel or other type of structure on which it is mounted, the insertion loss is introduced. The insertion loss (IL) of an acoustical part mounted on a structure represents the difference between the transmission loss of the structure equipped with the acoustical part and the transmission loss of the structure alone:

$$IL_{part} = TL_{part+steel} - TL_{steel} (dB)$$

The insertion loss and the absorption coefficient were simulated using SISAB, a numerical simulation software for the calculation of the acoustical performance of acoustical parts, based on the transfer matrix method. The transfer matrix method is a well-known method for simulating sound propagation in layered media and is described, for instance, in BROUARD B., et al., "A general method for modelling sound propagation in layered media," *Journal of Sound and Vibration.* 1995, vol. 193, no. 1, p. 129-142.

FIG. 1 shows the insertion loss curves of the two prior art comparative samples (samples A and B) and of an acoustic trim part consistent with the disclosed embodiments (sample C). The simulated insertion loss shown reflects the transmission loss of the multilayer, as defined above, minus the transmission loss of the steel plate on which the multilayer sample was applied. All samples have the same total thickness of 25 (mm).

Comparative sample A represents a conventional mass-spring system with the mass layer formed from an EPDM heavy layer material of 1 (kg/m$^2$) and injected foam as the decoupling layer. The total area weight of sample A was 2370 (g/m$^2$).

Comparative sample B represents the multilayer structure disclosed in EP 1428656. In particular, sample B represents a multilayer structure having a foam layer, a fibrous layer, and a film in between the foam and fibrous layers. The top fibrous layer is an air-laid soft felt layer with an area weight of 1000 (g/m$^2$), a thickness of 6 (mm), and an AFR of 1000 (Nsm$^3$). The simulated multilayer has a total area weight of 2150 (g/m$^2$), a dynamic Young's modulus of about 70000 (Pa), and a radiation frequency of about 1700 (Hz). The film is impervious and has a thickness of about 0.06 (mm). The foam layer has an area weight of 1100 (g/m$^2$).

Sample C is consistent with the disclosed embodiments, and contains the same decoupling layer and film barrier layer as comparative sample B. The porous fibrous layer on top of the film layer was made of a compressed rigid felt layer with an area weight of 900 (g/m$^2$), a thickness of 3 (mm) and a dynamic Young's modulus of 550000 (Pa). According to Equation 1, this material will have a radiation frequency in the area of around 7100 (Hz).

Turning to FIG. 1, sample A is a conventional mass-spring system-with an area weight for the heavy layer of 1 (kg/m$^2$). The insulating performance is high over a large range of frequencies and therefore exhibits good noise attenuation for a car. However, in practice higher area weight for the mass layer is used and the system may be too heavy for certain applications. Furthermore, the material normally used for heavy layer, in this case EPDM, may be difficult to recycle. In terms of weight, the sound absorbing system (sample B) is lighter and therefore may be preferred. In terms of overall noise attenuation, the conventional mass-spring system (sample A) may still be superior. In comparative sample B, the material of the top felt layer has a radiation frequency of about 1700 (Hz) that compromises the insulation characteristics of the multilayer. This is visible in the IL curve by a dip in the ⅓ octave frequency band of 1.6 kHz, i.e., the ⅓ octave frequency band including the radiation frequency of the top felt layer used for this sample.

By increasing the dynamic stiffness of the upper layer, in particularly by increasing the compression stiffness in the out-of-plane direction of the layer, the radiation frequency of the material could be shifted to a higher frequency. By choosing a material for the top porous fibrous layer with a dynamic Young's modulus, at which the radiation frequency of the material is outside of the frequency range considered effective for noise attenuation in vehicles, the material may behave as a mass element for a mass-spring system over such frequency range.

Sample C, for instance, has a porous fibrous layer on top of the film barrier layer made of a compressed rigid felt layer with an area weight of 900 (g/m$^2$), a thickness of 3 (mm) and a dynamic Young's modulus of 550000 (Pa). It shows an insertion loss comparable and even better than the conventional mass-spring system with a 1 kg heavy layer. And the radiation frequency only appears as a dip in the ⅓ octave frequency band centered at 6300 (Hz). This may be far above the frequency range normally considered for noise attenuation in a vehicle.

The effect, that a thin barrier layer together with a porous fiber top layer with a dynamic Young's modulus of at least 96·AW·t (Pa) may form a mass layer with characteristics comparable with those of the mass element of a classical acoustic mass-spring system, may depend on the compression of the felt. It may also depend on the type of material used and the amount of binding between the material components, for instance between the fibers or the resin and fibers. Equation 1 may give therefore only guidance to how to design a trim part according to the disclosed embodiments. The actual frequency where the radiation frequency in reality occurs may deviate from the calculated one. However, as long as it appears above at least 4900 (Hz), it may not interfere with the noise attenuation typically desired in vehicles. For other applications, the minimal dynamic Young's modulus needed might differ. However, one of ordinary skill in the art will appreciate how to adjust the equation based on the description herein.

Optimizations of sound attenuation of acoustic trim parts, as given in the state of the art, are directed to defining the AFR of at least the upper layer or the absorbing layers. For certain acoustic trim parts consistent with the disclosed embodiments, the radiation frequency of the upper felt layer does not depend strongly on its AFR. In certain embodiments, the AFR may have mainly a damping influence on the slope of the insertion loss over the whole frequency range measured. The damping effect increases as the AFR increases.

As described herein, acoustic trim parts consistent with the disclosed embodiments may surprisingly obtain an insulation effect that is largely independent to the AFR of the porous fibrous layer. As described above on the other hand, the dynamic Young's modulus of the porous fibrous layer may be used to obtain a consistent insulation without any dip effect in trim part's IL curve over the range of frequencies of interest.

When the thickness of the porous fibrous layer is changed, both the AFR and the Young's modulus change and, in general, both the AFR and the Young's modulus increase when the thickness of the layer decreases. However, the layer's AFR and Young's modulus are related to the characteristics of the material forming the layer. The AFR and the Young's modulus, as well as other acoustical and mechanical parameters of a porous material, are not functions of only the layer's thickness.

As an example, two materials with the same thickness can have different AFR, depending on their characteristics. A typical "airlaid" felt used for automotive applications was measured with an AFR system, showing a value of 3200 (Nsm-3) at a thickness of approximately 2.5 mm. For a single material, the AFR can depend on the material's thickness. For example, the same "airlaid" felt as above measured at a thickness of approximately 6 mm, showed a value of 1050 (Nsm-3). On the other hand, a typical "needled" felt used for automotive applications, having the same thickness (6 mm) and approximately the same area weight as the above "airlaid" felt (1000 g/m$^2$), showed a value of 220 (Nsm-3). At the same thickness, the two materials thus have a different AFR. The difference is attributed, at least in part, to the way each materials' fibers are processed.

The same consideration applies for the dynamic Young's modulus. While the Young's modulus will increase as the thickness decreases, two different materials of the same thickness do not necessarily have the same Young's modulus. They may have very different Young's moduli, depending on their composition and on the way they are produced.

Figure 11:
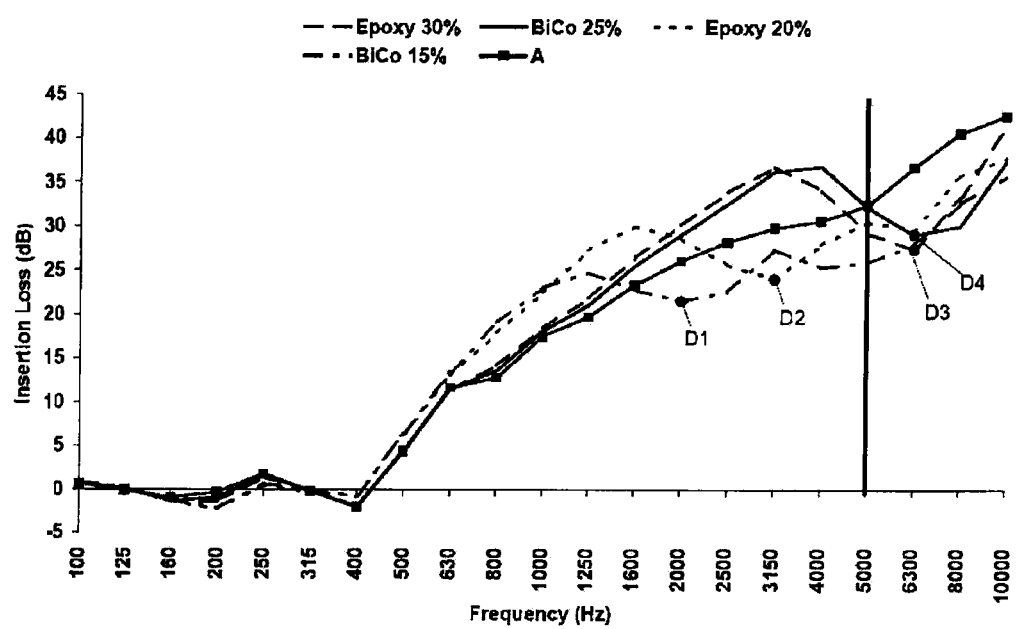
FIG. 11 illustrates a graph comparison of the insertion loss of different samples.

Moreover, the AFR and the Young's modulus are independent parameters. The AFR relates to the acoustical characteristics of the material, while the Young's modulus relates to the mechanical characteristics of the material. As an example, two materials with the same AFR (e.g., due to a similar distribution of the fibers in the materials) can have a different Young's modulus (e.g., due to a different amount of binders in the material). As described above, a different Young's modulus may impact the system's acoustical performance. As described below for example, FIG. 11 illustrates how the IL curve for different samples may differ based on the Young's modulus rather than AFR.

Figure 2:
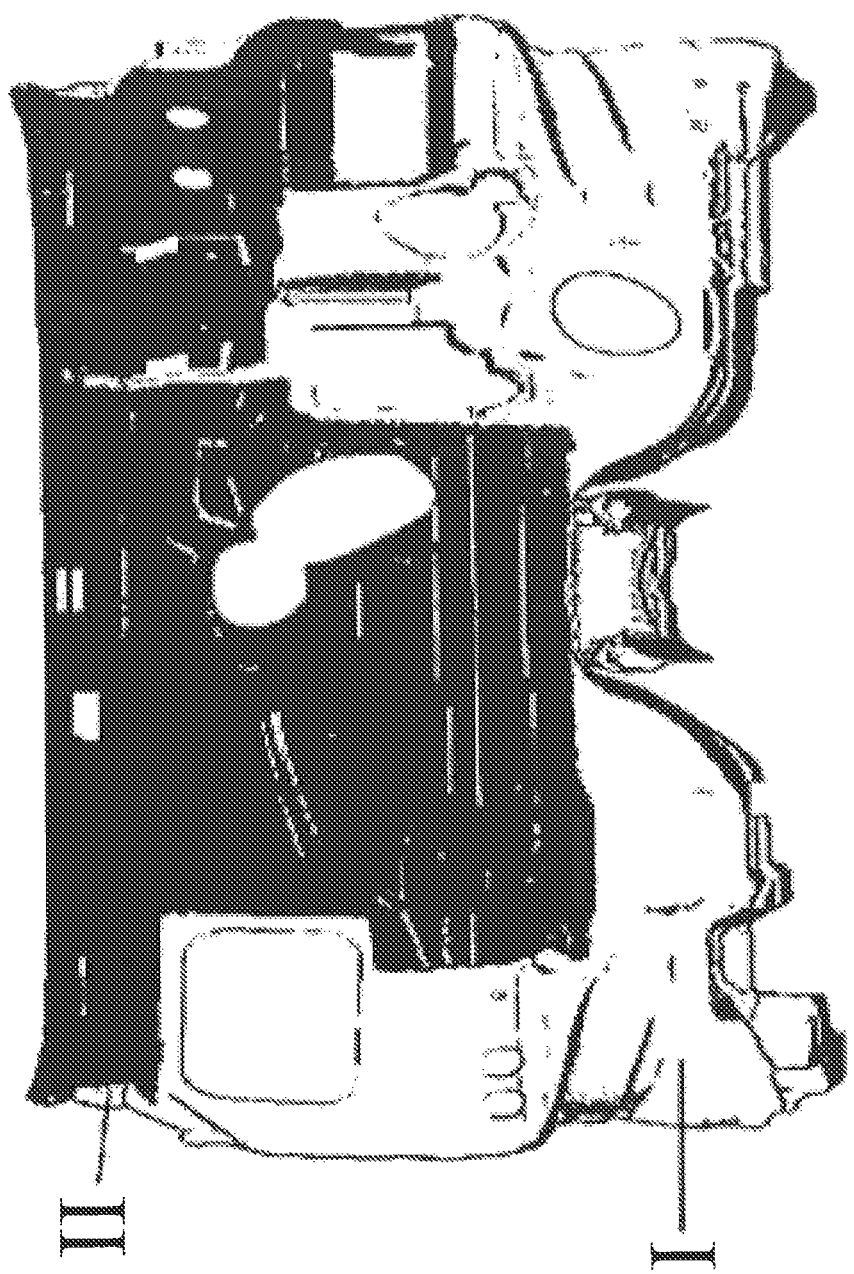
FIG. 2 illustrates an example of an inner dash trim part with regions of sound insulation and regions of sound absorption.

FIG. 2 shows an exemplary inner dash part with two areas having different acoustic functions. Generally, the lower part (Area I) of an inner dash may be more suitable for insulation, because the noise path coming from the engine and the front wheels through the lower area may be more relevant. The upper part (Area II) of the dash may, however, be more suitable for absorption, because some insulation may already be provided by other elements of the car, such as the instrumentation panel.

To achieve an overall better sound attenuation for an inner dash trim part, it may thus be built with different areas. An insulating area (I) may be formed with the alternative mass layer consistent with the disclosed embodiments, and the absorbing area (II) may be formed by the same porous fibrous layer, but not adjusted for purposes of insulation (e.g., a non-rigid fibrous layer). Thus area (I) of the trim part in the inner dash may contain a mass-spring system consistent with the disclosed embodiments. Area (II) may thus contain a non-rigid porous fibrous layer that functions as a standard absorber known in the art.

Figure 3:
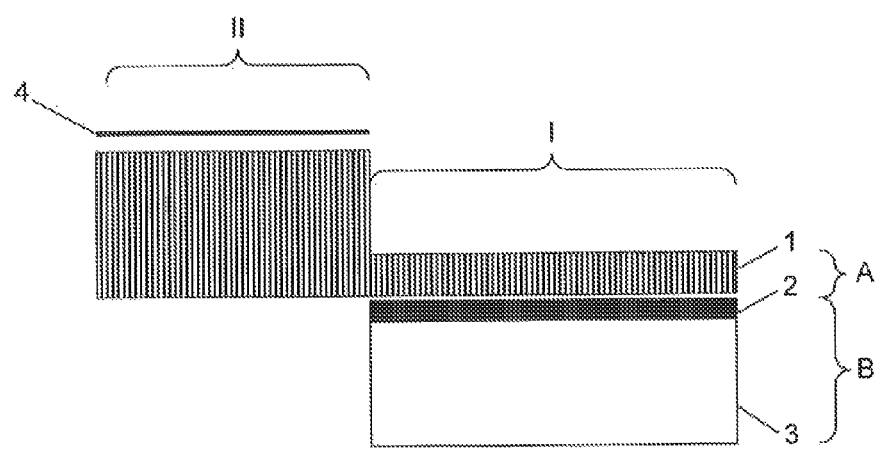
FIG. 3 illustrates a schematic of an exemplary multilayer for either the insulating area or the absorbing area according to the invention.

FIG. 3 shows a schematic cross section of a multilayer according to the disclosed embodiments. As shown, the multilayer may contain at least an area with sound insulating characteristics (I), referred to as an insulating area, and an area with sound absorbing characteristics (II), referred to as an absorbing area. One skilled in the art will readily appreciate that the location of the areas on the part depends on the area of the vehicle where the part is used and on the expected noise level and frequencies in that specific area.

In the embodiment of FIG. 3, the insulating area (I) and the absorbing area (II) have at least the same porous fibrous layer 1, whereby this layer in the insulating area is compressed to form a rigid layer 1, such that the dynamic Young's modulus of this porous fibrous layer is at least $96 \cdot AW \cdot t$ (Pa), with AW being the area weight (g/m$^2$), and t being the thickness (mm) of the porous fibrous layer. In this embodiment, the insulation characteristic is also formed with a mass layer A including thin barrier layer 2 and the porous fibrous layer 1, and with a spring layer B including a decoupling layer 3. Together, layers A and B form an acoustic spring-mass system. Area I may thus provide a sound-insulating characteristic.

In area II, the porous fibrous layer 1 is not compressed thus enabling sound absorbing characteristic in this area. In certain embodiments, an additional scrim layer 4 may be placed on top of the absorbing area to enhance the sound absorbing effect even further.

Figure 4:
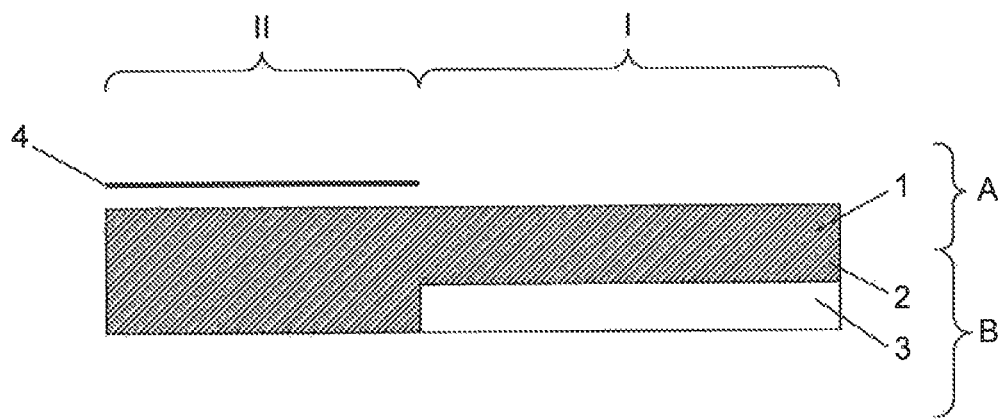
FIG. 4 illustrates a schematic of an alternative multilayer for either the insulating area or the absorbing area according to the invention.

FIG. 4 shows an alternative multilayer according to one disclosed embodiment. In contrast to FIG. 3, an area underneath the compressed fibrous layer 1 may be used for the addition of the thin barrier layer 2 and the decoupling layer 3, which may produce a more compact or evenly distributed part. However, one skilled in the art will appreciate that an automotive trim part consistent with the disclosed embodiments may also implement a combination of the embodiments of FIGS. 3 and 4, depending upon the particular application. Moreover, the areas between the insulating area (I) and the absorbing area (II) may not be abruptly defined as illustrated in FIGS. 3 and 4, but may have intermediate transition areas.

Figure 5:
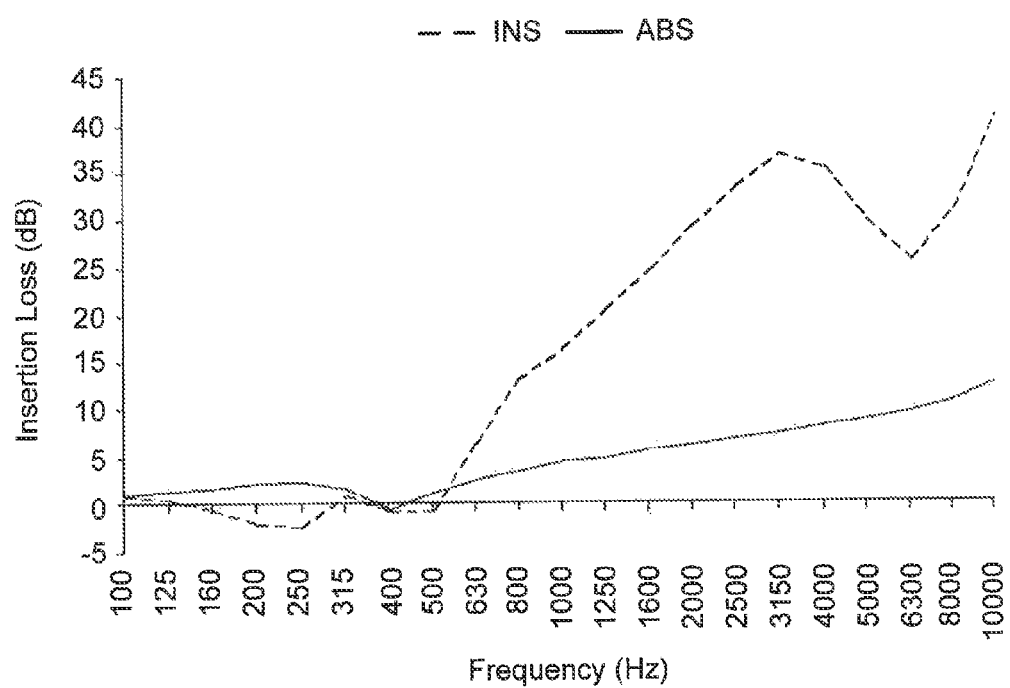
FIG. 5 illustrates an insertion loss of multilayer according to FIG. 3 or 4.
Figure 6:
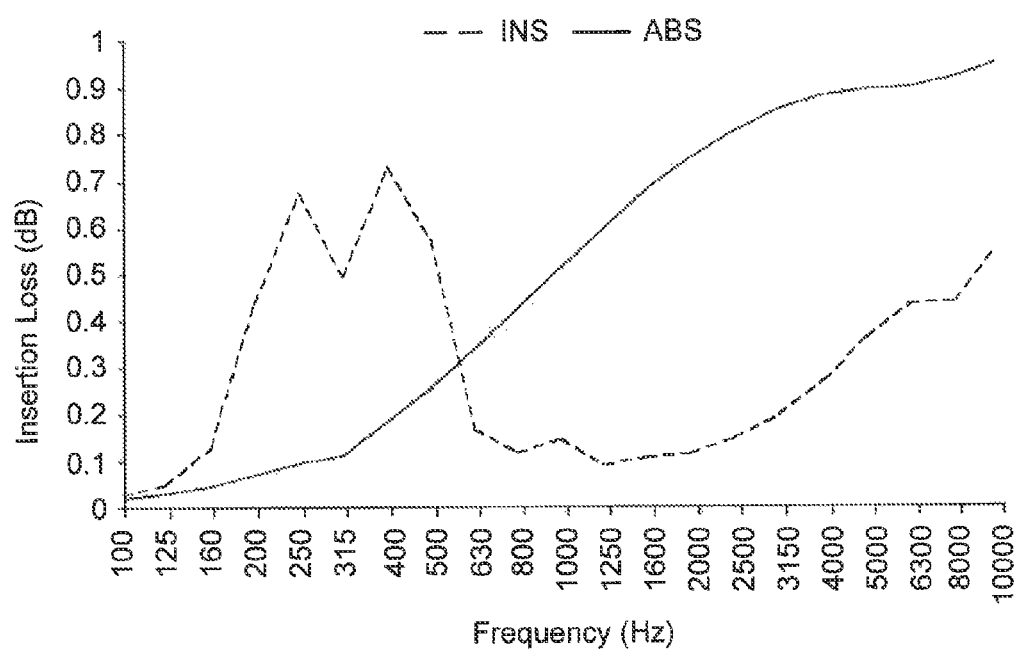
FIG. 6 illustrates an absorption of multilayer according to FIG. 3 or 4.

The insertion loss and absorption curves were simulated for multilayers according to FIG. 3 or 4, without the scrim layer, and they are shown, in FIG. 5 and FIG. 6. More specifically, FIG. 5 illustrates the insertion loss and FIG. 6 illustrates the absorption curves for the insulation area (I) (labelled "INS") and the absorbing area (II) (labelled "ABS"). The features for the different layers, corresponding to the simulations of FIGS. 5 and 6, are described further below.

In particular, the absorbing area (II) was simulated as consisting of a porous fibrous layer 1 in the form of a cotton based felt with 30% Epoxy binder, with a thickness of 20 mm and an area weight of 1100 (g/m$^2$). The insulation area (I) contains the same porous fibrous layer compacted to 2.7 (mm) to be compliant with the dynamic Young's modulus requirements according to Equation 1, a film layer and a foam decoupling layer. The total thickness of the insulation layer is about 20 mm.

From the insertion loss shown in FIG. 5, the radiation dip appears only around 6300 (Hz) for the insulating area. An increase in overall insertion loss may also be observed, illustrating the improved insulation characteristics of the disclosed embodiments. The absorbing area, does not include a material that acts as a spring and thus the insertion loss curve shows values that are close to zero over the analyzed frequency range. From the absorption curve shown in FIG. 6, the absorption of the insulation area is low, while the absorption of the absorbing area is much higher.

A trim part sharing both insulating areas and absorbing areas may thus improve the overall sound attenuating performance of the trim part. In particular, by dedicating an area to a certain type of sound attenuation (insulation or absorption) on the same trim part, the areas may be defined in advance and may be formed in the part without the need of additional patches or other materials. A large trim part, such as a carpet or inner dash insulator, could thus be made in one piece, even if the trim part may require different sound characteristics at different locations along the part.

Figure 7:
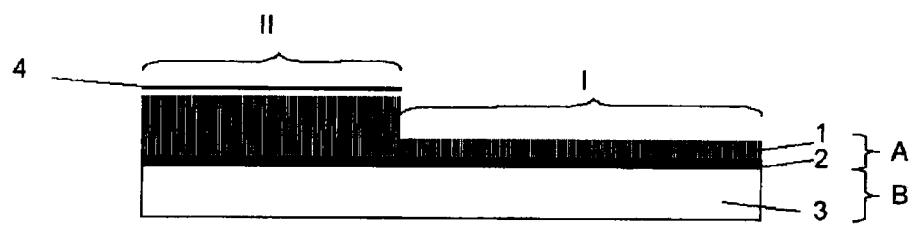
FIG. 7 illustrates a schematic of an exemplary alternative multilayer for either the insulating area or the absorbing area according to the invention.
Figure 8:
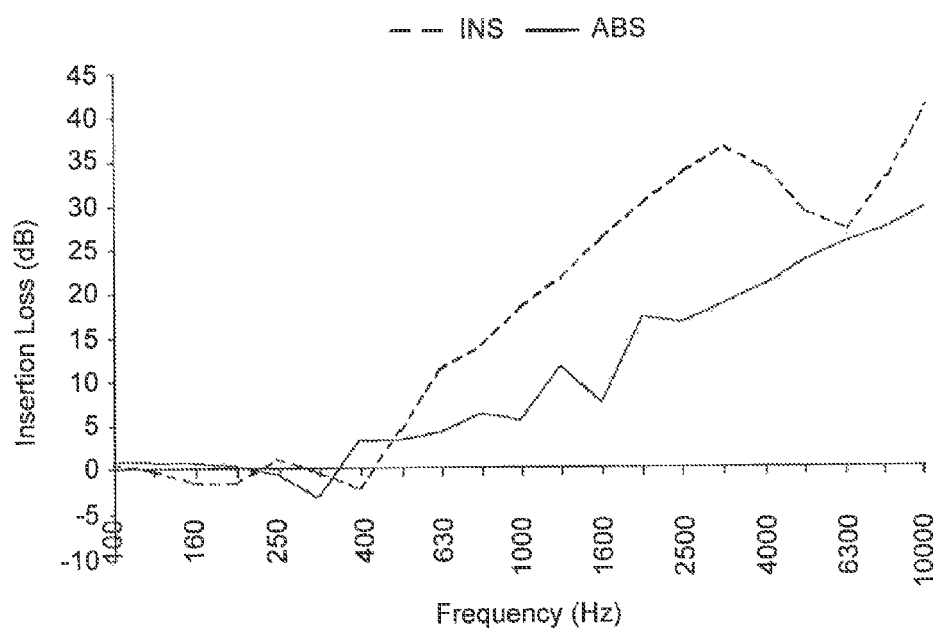
FIG. 8 illustrates an insertion loss of multilayer according to FIG. 7.
Figure 9:
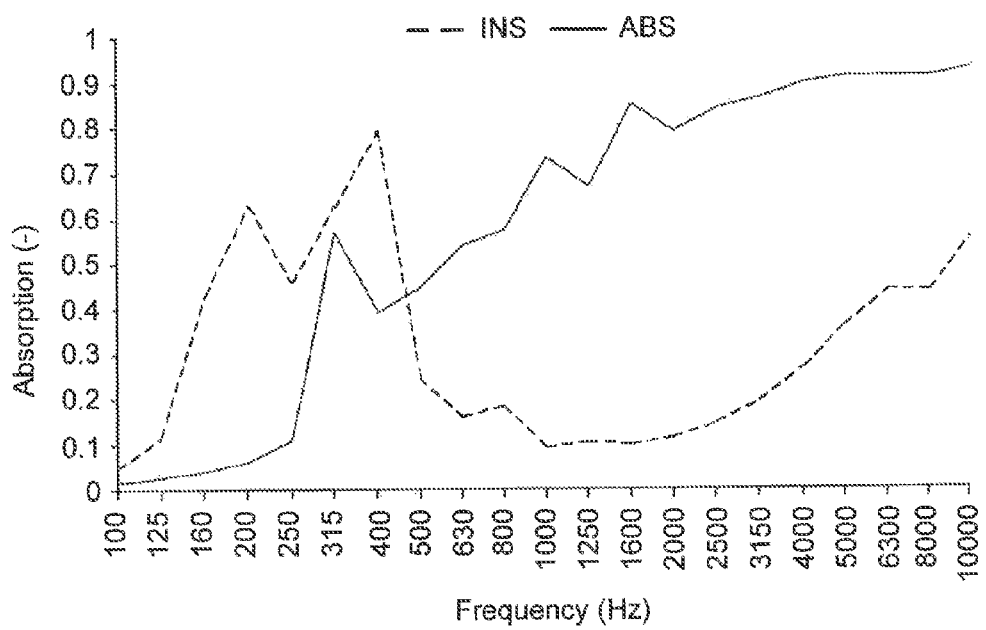
FIG. 9 illustrates an absorption of multilayer according to FIG. 7.

FIG. 7 shows an alternative embodiment, where the film and decoupler may be available over the whole surface of the part including the absorbing area(s). However, this may change the insulation properties as may be seen from FIG. 8 and FIG. 9. In this example, a multilayer was simulated having a total thickness of 25 mm, consisting of a cotton felt with 30% Epoxy resin as a binder for the porous fibrous layer with 2.7 (mm) thickness and an area weight of 1100 (g/m$^2$) in the insulation area and 17.3 (mm) in the absorbing area, an impervious film and a foam decoupler. Although the absorbing area functions as a spring-mass system, its insertion loss curve will show an insulation dip around 1000 and 1600 (Hz), disturbing the noise attenuation in a desired range of frequencies. The dip for the insulating area is around 6300 (Hz), comparable to the previous example. For the both samples, however, the insertion loss curve found for the absorbing area is slightly impaired due to the radiation frequency. Although this solution may, in some applications, have some acoustical disadvantages in comparison with the other disclosed embodiments, it may still have advantage in comparison with the current state of the art. Further, the use of the foam layer over the whole area of the trim part may help to form a more uniform part in comparison with only locally applied foam (e.g., when the foam is injected in a mould).

Other alternative solutions might be to have the thin barrier layer only partly in the insulating areas, but the decoupler over the whole surface so that in the areas without thin barrier layer the decoupler may function together with the porous fibrous layer as a double layer absorber.

To enhance the overall function of either the insulating area and/or the absorbing area, an additional absorbing material may be placed on top of the porous fibrous layer at the opposite side from the decoupling layer. Also, the use of a nonwoven material 4, as shown, for example, in FIG. 7, may enhance the absorbing characteristics of the trim part.

Normally, a fibrous material is produced in blanks, e.g., a semi-finished good in which the fibers are assembled together. A blank may be considered homogeneous. A blank is generally composed by a sheet of material having an initial thickness and may be characterized by its area weight since the fibers are usually evenly distributed on the area. When a blank is formed, for example, by compression, it may assume a final shape with a certain thickness. The area weight (the weight of the material in the unit area) is typically maintained after the forming process. From the same blank, several final thicknesses can thus be obtained, depending on the level of compression.

The dynamic Young's modulus of the material depends on several parameters. One is the characteristics of the felt (e.g., its composition, type and amount of fibers, type and amount of binders, etc.). Another parameter is the density of the material, which relates to the material's thickness. Therefore, for a certain composition of felt, the dynamic Young's modulus can be measured at the different thicknesses and will consequently assume different values, normally increasing when the thickness is decreased (for the same initial blank).

To be a porous fibrous layer consistent with the disclosed embodiments, the layer's dynamic Young's modulus has to be compared to the layer's measured value of the dynamic Young's modulus. If the measured value is at or above the minimum necessary dynamic Young's modulus given by Equation 1 (96·AW·t), then the specific layer may act as a rigid mass achieving optimal insulation performance.

In one example implementation, the design of a fibrous porous layer acting as a rigid mass may, consistent with the disclosed embodiments, be implemented as follows:
 1. A felt composition and an area weight are chosen.
 2. The material is then formed at a certain thickness.
 3. The area weight (AW, g/m2) and the thickness (t, mm) of the formed material are measured.
 4. The Young's modulus is measured through Elwis-S, for a formed sample at the thickness t (measured Young's modulus: $E_{meas}$)
 5. The minimum necessary Young's modulus ($E_{min}$) is calculated by the formula 96·AW·t, where AW is the area weight (g/m2) and t the thickness (mm), both just measured.
 6. It has to be verified that the condition $E_{meas} > E_{min}$ is fulfilled.

If the condition is fulfilled, then it may be determined, consistent with the disclosed embodiments, that the choice of the material is satisfactory. The fibrous material can thus be used at the determined thickness, acting as a rigid insulating mass. Otherwise, a designer may select a different composition and reiterate the process above.

Figure 10:
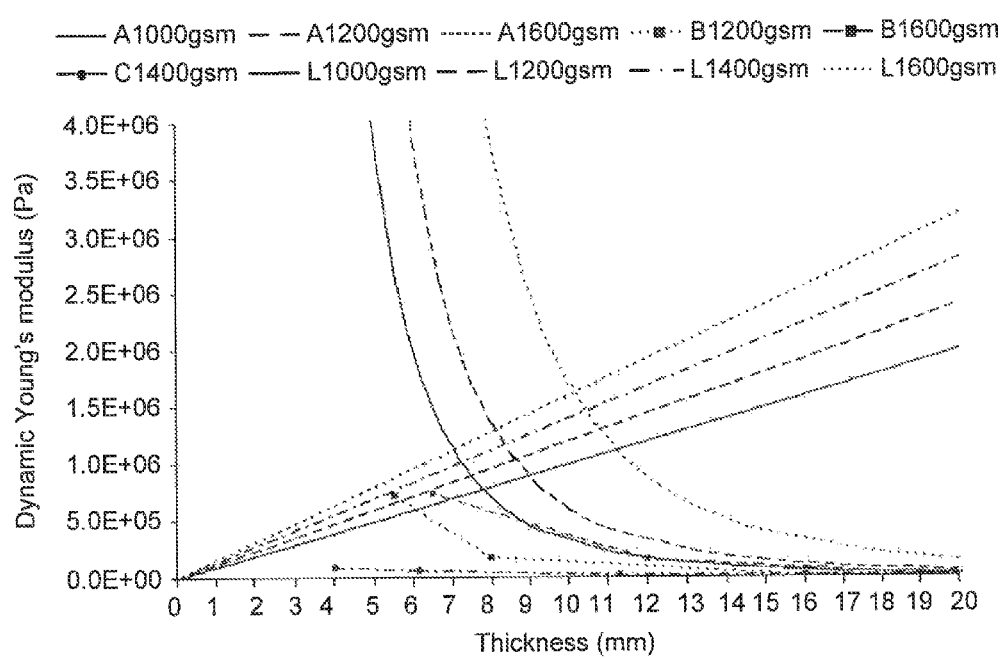
FIG. 10 illustrates a graph of the dynamic E modulus in relation to the area weight and the thickness of the porous fibrous layer.

The following describes the design of an acoustic trim part consistent with the disclosed embodiments. FIG. 10 shows a graph of dynamic Young's modulus versus thickness for an insulating mass layer according to a disclosed embodiment. In this example embodiment, the fibrous layer may be formed of a felt layer made primarily of recycled cotton with 30% phenolic resin.

Referring to FIG. 10, line L1000 gsm shows, as a function of the layer's thickness, the minimum dynamic Young's modulus of a porous fibrous layer, with an area weight of 1000 (g/m2), consistent with the disclosed embodiments. This was calculated with the formula $$E = AW \cdot 4tv^2$$

with v being 4900 Hz. Lines L1200 gsm, L1400 gsm and L1600 gsm in FIG. 10 show similar data for the area weights of 1200, 1400 and 1600 (g/m2). The dynamic Young's modulus of a porous fibrous layer with a given thickness and one of these area weights should be above the line corresponding to its area weight, to make sure that the layer's radiation frequency is shifted to at least 4900 Hz and thus outside of the frequency range of primary interest for noise attenuation in vehicles.

In FIG. 10, line A1000 gsm shows, as a function of the layer's thickness, the measured dynamic Young's modulus of a layer of primarily cotton felt with 30% phenolic resin having an area weight of 1000 (g/m2). In FIG. 10, lines A1200 gsm, A1600 gsm show similar data for the area weights of 1200 (g/m2) and 1600 (g/m2), respectively. For certain points, the dynamic Young's modulus was determined and the behavior as depicted was extrapolated from these points. This material shows a quick increase in the dynamic Young's modulus already showing a radiation frequency above 4900 (Hz) at an area weight of 1000 (g/m2) and a thickness of around 8 (mm). However, due to space restrictions this thickness may not be preferred in the interior of a car, such as an inner dash. Although in theory it would be possible to come to the right dynamic Young's modulus with much lower densities, the weight of the porous fibrous layer trim part may no longer be enough to guarantee that the part can function as a good insulating part.

In FIG. 10, line B1200 gsm shows, as a function of the layer's thickness, the dynamic Young's modulus of a layer of primarily cotton felt material with 30% epoxy resin and an area weight of 1200 (g/m2). Line B1600 gsm shows similar data for the case of the area weight of 1600 (g/m2). For certain points, the dynamic Young's modulus was determined and the behavior as depicted was extrapolated from these points. If one compares these data with those for phenolic resin felt discussed before, it is seen that the binding material has an effect on the compression stiffness of the material and hence on the dynamic Young's modulus at a certain area weight and thickness.

Line C1400 gsm shows, as a function of the layer's thickness the dynamic Young's modulus of a layer of primarily cotton felt material bound with 15% bi-component binding fibers and having an area weight of 1400 (g/m2). For certain points, the dynamic Young's modulus was determined and the behavior as depicted was extrapolated from these points.

In a second set of samples shown in FIG. 11, the influence of binder material, particularly the type and amount of binder, is examined in more detail.

Sample EPDXY30%, representing cotton felt with 30% Epoxy with a measured area weight of 1090 (g/m²) and a thickness of 2.7 (mm), was found having a measured dynamic Young's modulus of 5.55E5 (Pa), higher than an exemplary dynamic Young's modulus as calculated according to one disclosed example embodiment.

Sample EPDXY20%, representing cotton felt with 20% Epoxy with a measured area weight of 1450 (g/m²) and a thickness of 4 (mm), was found having a measured dynamic Young's modulus of 2.2E5 (Pa), much lower than an exemplary dynamic Young's modulus as calculated according to one disclosed example embodiment.

Sample BICO25%, representing cotton felt with 25% bi-component binding fibers with a measured area weight of 1040 (g/m$^2$) and a thickness of 2.1 (mm), was found having a measured dynamic Young's modulus of 5.08E5 (Pa), much higher than an exemplary dynamic Young's modulus as calculated according to one disclosed example embodiment.

Sample BICO15%, representing cotton felt with 15% bi-component binding fibers with a measured area weight of 1280 (g/m$^2$) and a thickness of 4 (mm), was found having a measure dynamic Young's modulus of 9.91E4 (Pa), much lower than an exemplary Young's modulus as calculated according to one disclosed example embodiment.

For these samples, the insertion loss was also simulated. FIG. 11 shows the simulated insertion loss of these samples, based on 25 (mm) thick samples having a top layer as defined above, a 70 (µm) film, and the remaining thickness covered with foam as the decoupler.

The measured and calculated frequencies for the samples own radiation are appearing as a dip in the IL curves. For the samples EPDXY25% and BICO15%, the radiation frequency found was at 3150 and 1600 (Hz) both in the area of interest for the attenuation of sound in a car. While the radiation frequency of EPDXY30% and BICO25% were found both at around 6300 (Hz), outside the area of interest for the automotive industry.

The measured and calculated radiation frequencies for the samples appear as a dip D in the IL curves. For the samples EPDXY20% and BICO15%, the radiation frequency found was at 3150 (Hz) (D2) and 2000 (Hz) (D1) both in the area of interest for the attenuation of sound in a car. While the radiation frequency of EPDXY30% and BICO25% were found both at around 6300 (Hz) (D3 and D4), outside the area of interest for the automotive industry.

Based on the above description, certain materials may not be suitable to form the mass layer according to the disclosed embodiments. For example, some materials may need to be compressed to a thickness not possibly achievable or only at an impractical manufacturing cost. However, by adjusting the ratio of binding material versus fibrous material, the binding material used, and the area weight and/or thickness, it is possible to design materials suitable to be used as a porous fibrous mass layer according to the disclosed embodiments.

The sound insulating trim part consistent with the disclosed embodiments, with some areas dedicated to absorption and other areas dedicated to insulation, where both areas share the same porous fibrous layer, can be used in a car, such as an inner dash, as described previously. The sound insulating trim part may also be used as a floor covering, such as with a decorative layer or a carpet layer on top. In such an implementation, the carpet layer may be a porous material, such as a tufted carpet or a nonwoven carpet. The sound insulating trim part may also be used in outer or inner wheel liners. All applications may be in vehicles, such as a car or a truck.

Other embodiments will be apparent to those skilled in the art from consideration of the specification and practice of the disclosed method and apparatus. It is intended that the specification and examples be considered as exemplary only, with a true scope and spirit of the invention being indicated by the following claims.

What is claimed is:

1. A sound insulating trim part, comprising:
    at least one absorbing area with a sound absorbing characteristic, wherein the absorbing area comprises at least a first portion of a porous fibrous layer formed of a material having a dynamic Young's modulus; and
    at least one insulating area with an acoustic mass-spring characteristic, wherein the insulating area further includes:
        a mass layer, and
        a decoupling layer adjacent the mass layer, the decoupling layer comprised of a solid-phase material,
    wherein the mass layer further includes:
        a second portion of the same porous fibrous layer material included in the absorbing area, the second portion configured to have a dynamic Young's modulus (Pa) of at least about (96·AW·t), with AW being an area weight (g/m$^2$), and t being a thickness (mm) of the porous fibrous layer; and
        a barrier layer, between the porous fibrous layer and the decoupling layer, wherein the barrier layer, the porous fibrous layer, and the decoupling layers are laminated together, and
    wherein the thickness of the first portion of the porous fibrous layer in the absorbing area is larger than the thickness of the second portion of the same porous fibrous layer in the insulating area.

2. The sound insulating trim part of claim 1, wherein the area weight of the porous fibrous layer is between about 500 and about 2000 (g/m$^2$).

3. The sound insulating trim part of claim 1, wherein the barrier layer has a thickness of at least about 40 (µm).

4. The sound insulating trim part of claim 1, wherein the barrier layer has a thickness of less than about 200 (µm).

5. The sound insulating trim part of claim 1, wherein the thickness t of the porous fibrous layer in the insulating area is between about 1 and about 10 (mm).

6. The sound insulating trim part of claim 1, wherein the thickness t of the porous fibrous layer in the absorbing area is at least about 4 (mm).

7. The sound insulating trim part of claim 6, wherein the thickness t of the porous fibrous layer in the absorbing area is between about 4 and about 25 (mm).

8. The sound insulating trim part of claim 1, further including an additional absorbing layer at least partially on top of the porous fibrous layer.

9. The sound insulating trim part of claim 1, further including an additional scrim at least partially on top of the porous fibrous layer.

10. The sound insulating trim part of claim 1, further including a decorative layer at least partially on top of the porous fibrous layer.

11. The sound insulating trim part of claim 1, wherein the decoupling layer has a compression stiffness of less than about 100 (kPa).

12. The sound insulating trim part of claim 1, wherein the decoupling layer is porous.

13. A sound insulating trim part for a vehicle, wherein the trim part provides a combined insulator and absorber to at least a portion of the vehicle, the sound insulating trim part comprising:
    at least one absorbing area with a sound absorbing characteristic, wherein the absorbing area includes at least a first portion of a porous fibrous layer formed of a material having a dynamic Young's modulus; and
    at least one insulating area with an acoustic mass-spring characteristic, wherein the insulating area further includes:
        a mass layer; and
        a decoupling layer adjacent the mass layer, the decoupling layer comprised of a solid-phase material, wherein the mass layer further includes:
a second portion of the same porous fibrous layer material included in the absorbing area, the second portion configured to have a dynamic Young's modulus (Pa) of at least about (96·AW·t), with AW being an area weight (g/m$^2$), and t being a thickness (mm) of the porous fibrous layer; and
a barrier layer, between the porous fibrous layer and the decoupling layer, that is substantially air impervious and having a thickness smaller than that of the porous fibrous layer, and
wherein the thickness of the first portion of the porous fibrous layer in the absorbing area is larger than the thickness of the second portion of the same porous fibrous layer in the insulating area.

14. A sound insulating trim part, comprising:
at least one absorbing area with a sound absorbing characteristic, wherein the absorbing area comprises at least a first portion of a porous fibrous layer formed of a material having a dynamic Young's modulus; and
at least one insulating area with an acoustic mass-spring characteristic, wherein the insulating area further includes;
a mass layer; and
a decoupling layer adjacent to the mass layer, the decoupling layer comprised of a solid-phase material,
wherein the mass layer further includes:
a second portion of the same porous fibrous layer material included in the absorbing area, the second portion configured to have a dynamic Young's modulus (Pa) of at least about 96·AW·t, with AW being an area weight (g/m$^2$), and t being a thickness (mm) of the porous fibrous layer; and
a barrier layer, between the porous fibrous layer and the decoupling layer, wherein the barrier layer, the porous fibrous layer, and the decoupling layers are laminated together, and
wherein the thickness of the first portion of the porous fibrous layer In the absorbing area is larger than the thickness of the second portion of the same porous fibrous layer in the insulating area,
an additional absorbing layer provided at least partially on top of the porous fibrous layer; and
an additional scrim provided at least partially on top of the porous fibrous layer.

15. The sound insulating trim part of claim 14, wherein the area weight of the porous fibrous layer Is between about 500 and about 2000 (g/m$^2$).

16. The sound insulating trim part of claim 14, wherein the barrier layer has a thickness of at least about 40 (μm).

17. The sound insulating trim part of claim 16, wherein the barrier layer has a thickness of between about 60 and about 80 (μm).

18. The sound insulating trim part of claim 14, wherein the thickness t of the porous fibrous layer in the insulating area is between about 1 and about 10 (mm).

19. The sound insulating trim part of claim 14, wherein the thickness t of the porous fibrous layer in the absorbing area is between about 4 and about 25 (mm).

* * * * *